United States Patent
Meyer et al.

(10) Patent No.: US 12,404,881 B2
(45) Date of Patent: Sep. 2, 2025

(54) SAFETY VALVE

(71) Applicant: AVENTICS GmbH, Laatzen (DE)

(72) Inventors: Heinz-Hermann Meyer, Seelze (DE); Martin Pilcher, Hannover (DE)

(73) Assignee: Aventics GmbH, Laatzen (DE)

( * ) Notice: Subject to any disclaimer, the term of this patent is extended or adjusted under 35 U.S.C. 154(b) by 0 days.

(21) Appl. No.: 18/690,859

(22) PCT Filed: Sep. 12, 2022

(86) PCT No.: PCT/DE2022/100673
§ 371 (c)(1),
(2) Date: Mar. 11, 2024

(87) PCT Pub. No.: WO2023/041113
PCT Pub. Date: Mar. 23, 2023

(65) Prior Publication Data
US 2024/0401615 A1    Dec. 5, 2024

(30) Foreign Application Priority Data
Sep. 15, 2021 (DE) ...................... 10 2021 123 936.2

(51) Int. Cl.
*F15B 11/068* (2006.01)
*F16K 31/42* (2006.01)
(Continued)

(52) U.S. Cl.
CPC .......... *F15B 11/068* (2013.01); *F16K 31/423* (2013.01); *F15B 13/0405* (2013.01);
(Continued)

(58) Field of Classification Search
CPC .............. F15B 11/068; F15B 2211/851; F15B 2211/853; F15B 2211/8755;
(Continued)

(56) References Cited

U.S. PATENT DOCUMENTS

| | | | | |
|---|---|---|---|---|
| 3,265,089 A | * | 8/1966 | Nill | F16K 17/32 251/30.02 |
| 3,442,502 A | * | 5/1969 | Fischer | B60G 17/052 251/63 |

(Continued)

FOREIGN PATENT DOCUMENTS

| | | |
|---|---|---|
| DE | 1 273 288 | 7/1968 |
| DE | 2 811 374 A1 | 9/1979 |

(Continued)

OTHER PUBLICATIONS

International Search Report corresponding to PCT Application No. PCT/DE2022/100673, mailed Nov. 25, 2022 (5 pages).

*Primary Examiner* — Minh Q Le
(74) *Attorney, Agent, or Firm* — Maginot, Moore & Beck

(57) ABSTRACT

For connecting high pressures and flows, a safety valve includes a first main stage which, in a rest position, connects a fluid outlet to a first relief outlet and, in a switched position, connects a fluid inlet to a fluid connection for a second main stage. The second main stage, in a rest position, connects the fluid outlet to a second relief outlet and, in a switched position, connects the fluid connection to a fluid outlet. Both main stages are configured as seat valves having multipart tappets and, when the first main stage is connected, a first tappet part that is actuated counter to a spring load, in a first movement portion, initially sealingly abuts a second tappet part, as a result of which a relief passage to the first relief outlet is closed.

12 Claims, 4 Drawing Sheets

(51) Int. Cl.
*F15B 13/04* (2006.01)
*F15B 13/043* (2006.01)
*F15B 20/00* (2006.01)

(52) U.S. Cl.
CPC .......... *F15B 13/0431* (2013.01); *F15B 20/00* (2013.01); *F15B 2211/851* (2013.01); *F15B 2211/853* (2013.01); *F15B 2211/8755* (2013.01); *F15B 2211/8757* (2013.01)

(58) Field of Classification Search
CPC .......... F15B 2211/8757; F15B 13/0431; F15B 13/0405; F15B 20/00; F16K 31/423
USPC ...................................................... 137/627.5
See application file for complete search history.

(56) References Cited

U.S. PATENT DOCUMENTS

| | | | | |
|---|---|---|---|---|
| 4,052,996 A | * | 10/1977 | Burrus | G05D 16/107 |
| | | | | 137/627.5 |
| 5,117,868 A | * | 6/1992 | Wagner | F15B 20/00 |
| | | | | 137/625.6 |
| 5,337,788 A | | 8/1994 | Nelson | |
| 5,669,422 A | * | 9/1997 | Tarusawa | F15B 11/068 |
| | | | | 91/29 |
| 6,050,081 A | * | 4/2000 | Jansen | F16K 11/07 |
| | | | | 137/112 |
| 6,796,323 B1 | * | 9/2004 | Taylor | G05D 16/024 |
| | | | | 137/508 |
| 8,960,217 B2 | * | 2/2015 | Inagaki | F16K 11/0716 |
| | | | | 137/625.68 |
| 10,474,169 B2 | * | 11/2019 | Grödl | G05D 16/101 |
| 2005/0034772 A1 | * | 2/2005 | Herbst | F16K 31/1226 |
| | | | | 137/627.5 |
| 2005/0115605 A1 | * | 6/2005 | Lucidera | F15B 11/068 |
| | | | | 137/38 |
| 2006/0070673 A1 | * | 4/2006 | Decker | F15B 20/008 |
| | | | | 137/628 |
| 2007/0045579 A1 | * | 3/2007 | Wirtl | G05D 16/163 |
| | | | | 251/129.04 |
| 2019/0218884 A1 | * | 7/2019 | Jones | F15B 20/004 |
| 2024/0353017 A1 | * | 10/2024 | Gora | F15B 13/0401 |

FOREIGN PATENT DOCUMENTS

| | | |
|---|---|---|
| DE | 11 2012 004 574 B4 | 3/2018 |
| EP | 1 645 755 A2 | 4/2006 |
| FR | 2 566 549 A2 | 12/1985 |

\* cited by examiner

SAFETY VALVE

This application is a 35 U.S.C. § 371 National Stage Application of PCT/DE2022/100673, filed on Sep. 12, 2022, which claims the benefit of priority to Serial No. DE 10 2021 123 936.2, filed on Sep. 15, 2021 in Germany, the disclosures of which are incorporated herein by reference in their entirety.

TECHNICAL FIELD

The disclosure relates to a safety valve for control tasks with high pressures and flows.

BACKGROUND

For fluidic control tasks with high pressures and flows, there are operational safety requirements that result, for example, from the safety-specific standard EN ISO 13849. In practice, such requirements exist, for example, in the stretch blow molding of containers made of glass or PET, at pressures of up to 40 bar. Relevant safety functions here are the prevention of unexpected start-up of a machine or system, as well as an energy dissipation function for safely switching or relieving the machine or system energy-free. In fluid technology, suitable redundantly arranged valves are used as safety-related parts of the controller for this purpose, so that a single fault in one of these parts does not lead to loss of the safety function. Such redundant or two-channel structures, often in conjunction with sensor-based state monitoring for the detection of individual faults, and a suitable control, achieve higher categories and performance levels in terms of the standard and minimize the likelihood of dangerous failures, which can result in unexpected machine movements or noise emissions, for example. The protection of downstream system elements from damage by sudden pressure increases is particularly important in high-pressure applications. Sensor-based state monitoring in this context includes, for example, proximity switches or pressure sensors in order to be able to detect individual faults based on, for example, the position of the valve tappets or the pressure level of certain valve areas.

Integrated pneumatic safety valve solutions for the low-pressure range with spool valves are known from the prior art in which the prevention of unexpected start-up and the safe energy-free switching or venting of machine components is ensured by redundant valve functions. However, these solutions are not suitable for pneumatic control tasks with high pressures and flows.

In the prior art it is also known to ensure redundant valve functions under safety aspects by interconnecting several individual components, wherein seat valve solutions are particularly suitable for high pressures and flow rates. Due to their large number of components and interfaces, such interconnected solutions are relatively complex in terms of cost and time for installation, commissioning and parameterization, operational maintenance and the maintenance of often different supplier relationships. In addition, these solutions have design disadvantages, such as their relatively high installation space requirements or energy losses due to numerous flow deflections, for example, when connected with the use of base plates. In addition, the seat valves normally used are not overlap-free in their function, which is why a sudden temporary pressure increase at the relief outlet when switching a valve from energy-free switching (=relief) to energy switching (=pressurization) of a line or machine component—i.e., a fluidic short circuit between the pressurized fluid supply and the relief—is not reliably prevented by a purely constructive means. Especially at high pressures, such short circuits result in significant undesirable noise emissions and energy losses.

A soft start device for compressed air systems with a plurality of redundant venting switched positions is known from EP 1 645 755 A2. EP 1 645 755 A2 only discloses solutions for connecting components but not for their construction. Furthermore, no functions or means for preventing a sudden temporary pressure increase at the vent outlet upon switching a valve from venting to aeration of a line or machine component are disclosed.

DE 11 2012 004 574 B4 discloses a flow rate control device having an opening/closing valve with which the flow rate of a pressurized fluid can be switched between a throttled and an unthrottled state, as well as two switching valves arranged in series, each of which can be connected redundantly to a separate relief outlet. The flow rate control device disclosed by DE 11 2012 004 574 B4 does not disclose a low-deflection construction or an overlap-free function of the switching valves. Furthermore, no functions or means for preventing a sudden temporary pressure increase at the relief outlet upon switching a valve from energy-free switching to energy switching of a line or machine component are disclosed.

SUMMARY

The object of the disclosure is to provide a safety valve for switching high pressures and flows, which avoids the disadvantages of the prior art. In particular, a safety valve is to be provided with which an unexpected start-up is prevented and safe energy-free switching is ensured and at the same time a sudden temporary pressure increase at the relief outlet when switching from energy-free switching to energy switching is safely prevented by purely constructive means. Furthermore, the design of the safety valve is intended to enable low-deflection flow guidance.

According to the disclosure, the object is solved by a safety valve as disclosed herein.

The core of the disclosure is formed by a safety valve for connecting high pressures and flows, with a fluid inlet and a fluid outlet, having a first main stage which, in a rest position, connects the fluid outlet to a first relief outlet and, in a switched position, connects the fluid inlet to a fluid connection for a second main stage; a second main stage which, in a rest position, connects the fluid outlet to a second relief outlet and, in a switched position, connects the fluid connection to the fluid outlet; wherein both main stages are each designed as a seat valve having a linear movable tappet, and wherein the first main stage has a multipart tappet, and when transitioning from the rest position to the switched position, a first tappet part that can be actuated counter to a spring load, in a first movement portion initially sealingly abuts a second tappet part, as a result of which a relief passage to the first relief outlet is closed, and also with the movement of the second tappet part in a second movement portion or a further tappet part in a further movement portion, a pressurization passage between the fluid inlet and the fluid connection for the second main stage is opened, and the second main stage has a multipart tappet, and when transitioning from the rest position to the switched position, a first tappet part that can be actuated counter to a spring load, in a first movement portion, initially sealingly abuts a tappet part, as a result of which a relief passage to the second relief outlet is closed, and also with the movement of the second tappet part in a second movement portion or a further tappet part in a further movement portion, a pressurization passage between the fluid connection and the fluid outlet is opened counter to a spring load.

Due to the configuration of the two main stages in the seat valve design, the seat valve according to the disclosure is suitable for switching high pressures and flow rates. At the same time, due to its dual channel design, redundant energy-free switching and switching of connected consumers or machine components is always ensured. Both main stages must always switch before pressurization of the fluid outlet. If only one main stage switches, the fluid outlet remains relieved via the relief outlet of the other main stage. This prevents an unexpected start-up of a connected consumer in the event of a single fault. Even if one of the two main stages does not switch back to its closed rest position due to, for example, a spring break, the fluid outlet is already relieved via the main stage that has switched back. Furthermore, due to the multipart configuration of the tappets of the two main stages, a sudden temporary pressure increase at the relief outlets when switching from energy-free switching to energy switching is reliably prevented by purely constructive means, because the flow paths to the relief outlets are always first closed by the first tappet parts that are actuated first, before the pressurization passages are opened. The two main stages are overlap-free.

A reduction in the required installation space for the safety valve is achieved by the second tappet part of one or both main stages being formed with an internal fluid channel that opens into a first opening facing the first tappet part, wherein the first opening is closed by the end of the first tappet part facing it when the first tappet part sealingly abuts the second tappet part. Thanks to this configuration, a part of the fluid flow is guided via fluid channels that are integrated in the second tappet parts when the fluid outlet is relieved.

A further reduction in installation space is achieved here by the fluid channel opening at its end opposite the first opening into a second opening, which is arranged in the side face of the second tappet portion and the first and second openings opening into regions of the safety valve which can be separated from one another fluidically by closing the fluid channel. In an alternative embodiment, the fluid channel at its end opposite the first opening is crossed by a transverse bore or a plurality of transverse bores, each forming two bore openings in the side face of the second tappet portion, wherein the first opening and the bore openings open into regions of the safety valve which can be separated from one another fluidically by closing the fluid channel. In this embodiment, due to the presence of several outlets of the fluid channel in the side face, a greater tolerance is given for the installation position of the tappet with regard to any rotational play, such that a bore opening always points in the flow direction with as little deflection as possible.

To ensure a controlled pressure increase at the fluid outlet and prevent sudden pressure surges on connected consumers or machine components, a start-up valve is arranged in the flow path between the fluid inlet and the first main stage, which can be switched by the pressure present at the fluid outlet, wherein the start-up valve switches from a smaller flow cross-section to a larger flow cross-section upon reaching a definable pressure level at the fluid outlet. The required pressure level is defined by the design. In addition, the pressure level can be realized in an adjustable manner, for example by means of a spring with an adjustable preload. A consumer connected to the fluid outlet or connected machine components are only successively pressurized with the full fluidic system power after an initially slow pressure build-up as soon as the start-up valve has switched. The start-up valve can be configured to switch completely from a flow path with a smaller flow cross-section to another flow path with a larger flow cross-section, or to increase the flow cross-section by opening an additional, further flow cross-section by the switching operation.

In a compact design of the safety valve with a start-up valve, the smaller flow cross-section is formed by a fluid channel penetrating the shut-off body of the start-up valve. As a result, it is not necessary to design the smaller flow path as a separate throttle channel or bypass channel, for example. The throttle channel is integrated into the shut-off body of the start-up valve, for example a tappet. To adjust the fluidic system performance in the soft start position, the start-up valve is configured with an adjustable throttle to vary the smaller flow cross-section.

In a deflection-free design of the safety valve, the pressurization passages of the first and the second main stage or the pressurization passages of the first and second main stage and the larger flow cross-section of the start-up valve are arranged relative to each other, such that, in the switched positions of the valves between the pressurization passages or the pressurization passages and the flow cross-section, a linear flow path is formed. This ensures a deflection-free and therefore low-loss flow guidance in the switching state of the safety valve when pressurizing the fluid outlet. A further improvement has been achieved in that the fluid inlet and the fluid outlet are also arranged such that a linear flow path between the fluid inlet and the fluid outlet is formed together with the pressurization passages or the pressurization passages and the flow cross-section.

Preferably, the first and second main stages are configured to be fluidically actuated, in that the first tappet part is designed at its end facing away from the second tappet part with a piston, which can be pressurized on its side facing away from the first tappet part with a fluid pressure. In this embodiment, the number of external interfaces is reduced by pressurizing each of the pistons via an internal control fluid supply with the pressure present at the fluid input, for example by means of electrically switchable pilot valves.

To make the safety valve as compact and integrated as possible and to reduce the number of components and interfaces required for installation and commissioning, all components of the safety valve are designed as a structural unit in a common housing.

BRIEF DESCRIPTION OF THE DRAWINGS

Further advantages of the disclosure are in shown in detail below together with the description of the preferred exemplary embodiment of the disclosure with reference to the figures. The figures show:

FIG. 4 the sectional view according to FIG. 3 with the flow path drawn in.

DETAILED DESCRIPTION

Figure 1:
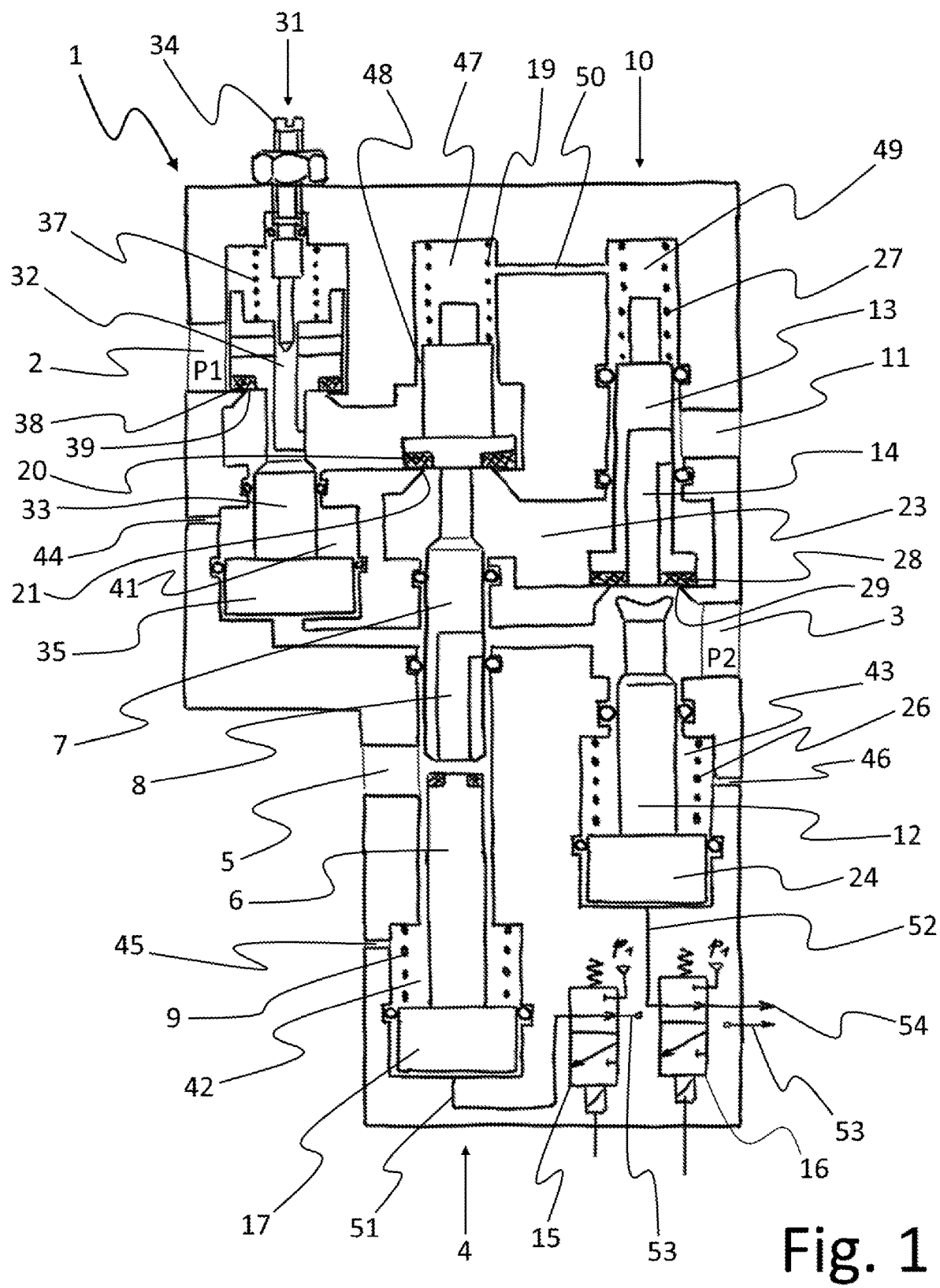
FIG. 1 a schematic cross-sectional diagram of a safety valve in the rest position.

FIGS. 1 to 4 show the safety valve 1 in a schematic cross-sectional view, which is suitable for switching high pressures and flows between a fluid inlet 2 and a fluid outlet 3. The illustrations of FIGS. 1 to 4 are simplified schematic representations of the safety valve 1 without detailed edge areas along the flow guide, which in practice are designed with smooth surfaces and flow-adapted edge transitions and contours, for example of the fluid passage or valve seat areas, in order to reduce internal friction in a structural design. FIG. 1 shows the safety valve 1 in its de-energized rest position. The fluid outlet 3 is used to connect a consumer (not shown), which can be a blow forming tool for blow forming containers from PET pre-forms, for example. The safety valve 1 has a first main stage 4, shown in FIG. 1 in its rest position, in which it connects the fluid outlet 3 to the first vent outlet 5. The first main stage 4 is configured in the seat valve design and has a linear movable, two-piece tappet formed by the lower first tappet part 6 and the upper second tappet part 7. In its rest position, the first main stage 4 connects the fluid outlet 3 to the first relief outlet 5, in that the second tappet part 7 is formed with an internal fluid channel 8, via which a working fluid can escape through an opening gap between the first tappet part 6 and the second tappet part 7 to the first relief outlet 5, wherein the first tappet part 6 is held in its initial position by the spring 9. The safety valve 1 also has a second main stage 10, also shown in FIG. 1 in its rest position, in which it connects the fluid outlet 3 to the second relief outlet 11. The second main stage 10 is also configured in the seat valve design and has a linear movable, two-piece tappet formed by the lower first tappet part 12 and the upper second tappet part 13. In its rest position, the second main stage 10 redundantly connects the fluid outlet 3 to the second relief outlet 11 in addition to the first relief outlet 5, in that the second tappet portion 13 is designed with an internal fluid channel 14, via which a working fluid can escape through an opening gap between the first tappet portion 12 and the second tappet portion 13 via the fluid channel 14 to the second relief outlet 11. The safety valve 1 further comprises two electrically switchable pilot valves 15 and 16 with which the tappets of the two main stages 4 and 10 can be actuated. The pilot valves 15 and 16 are shown schematically in the illustration of FIG. 1 with circuit symbols.

Figure 2:
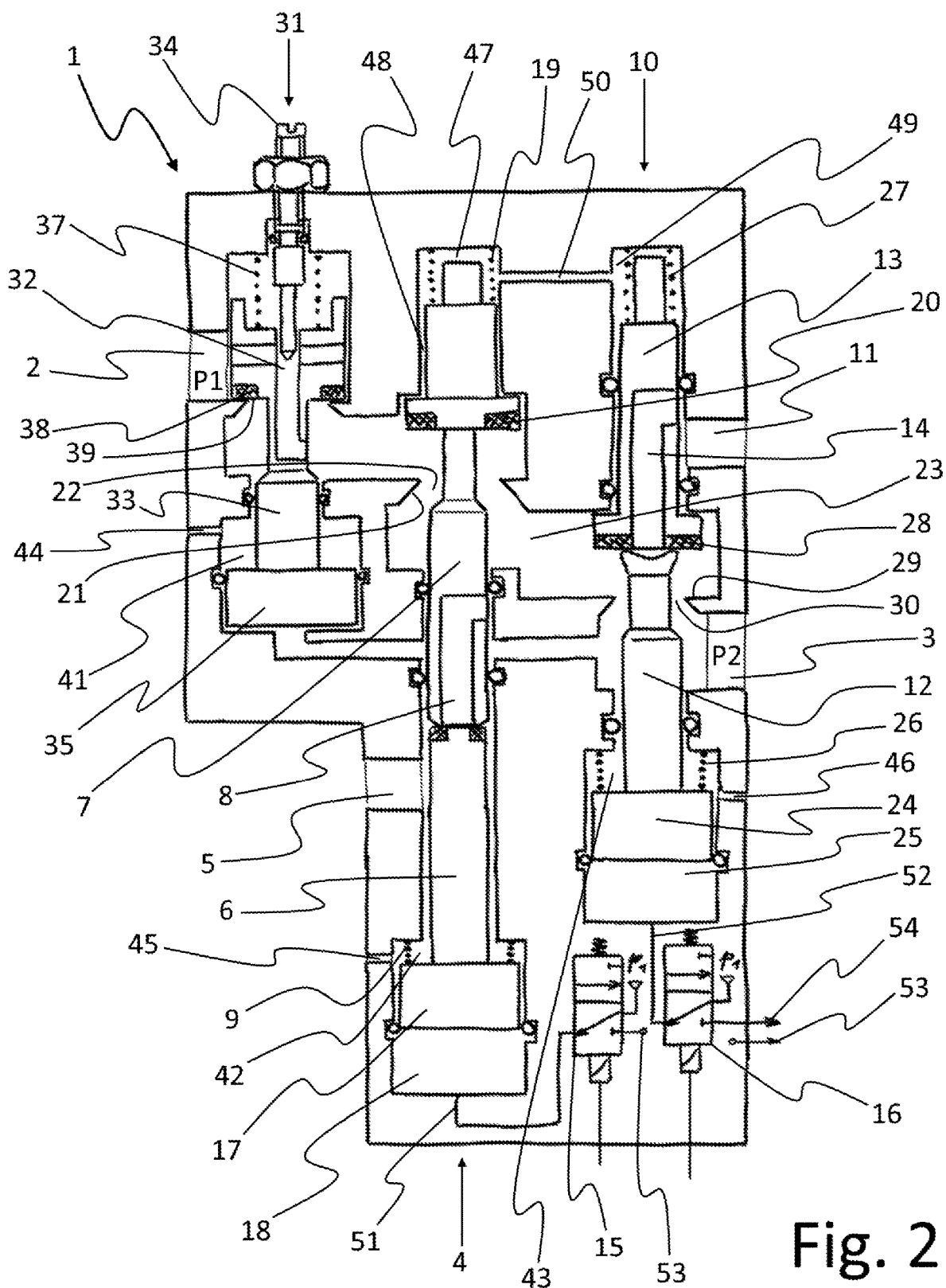
FIG. 2 a schematic cross-sectional view of the safety valve according to FIG. 1 in a soft start position.

FIG. 2 shows the safety valve in a soft start position in which only the two main stages 4 and 10 are switched and which causes a slow start-up of a consumer connected to the fluid outlet 3 (not shown). When the pilot valve 15 is switched, the piston 17 of the first tappet part 6 of the first main stage 4 is internally pressurized via the piston chamber 18 with the valve inlet pressure P1 present at the fluid inlet 2. The first tappet part 6 is thereby initially moved upwards counter to the force of the spring 9 in a first movement portion until it sealingly abuts the second tappet part 7, wherein it sealingly shuts off the fluid channel 8 counter to the first relief outlet 5. In a further movement, the first tappet part 6 subsequently lifts the second tappet part 7 in a second movement portion counter to the force of the spring 19, wherein the sealing body 20 formed in the upper section of the second tappet part 7 lifts off the valve seat 21 and opens a pressurization passage 22 between the fluid inlet 2 and the fluid connection passage 23 to the second main stage 10. After the completion of the second movement portion, the first main stage 4 is completely in its switched position, in which a fluid connection is established between the fluid inlet 2 and the fluid connection passage 23 to the second main stage 10. When the pilot valve 16 is switched, the piston 24 of the first tappet part 12 of the second main stage 10 is also internally pressurized via the piston chamber 25 with the valve inlet pressure P1 present at the fluid inlet 2. The first tappet part 12 is thereby initially moved upwards counter to the force of the spring 26 in a first movement portion until it sealingly abuts the second tappet part 13, wherein it sealingly shuts off the fluid channel 14 counter to the second relief outlet 11. In the further movement, the first tappet part 12 lifts the second tappet part 13 in a second movement portion counter to the force of the spring 27, wherein the sealing body 28 formed in the upper section of the second tappet part 13 lifts off the valve seat 29 and opens a pressurization passage 30 between the fluid connection passage 23 and the fluid outlet 3. After the completion of the second movement portion, the second main stage 10 is completely in its switched position, in which the fluid passage 23 is connected to the fluid outlet 3. The fluid outlet 3 is now supplied with a reduced volume flow compared to the possible system performance, which leads to a slowed pressure build-up at the fluid outlet 3, as the start-up valve 31 arranged in the flow path of the working fluid between the fluid inlet 2 and the first main stage 4 is in its rest position. In this soft start position, the working fluid only flows into the safety valve 1 via the smaller flow cross-section of the throttle channel 32 in the one-piece tappet 33 of the start-up valve 31. The flow cross-section can be adjusted via the position of the throttle screw 34. If both main stages 4 and 10 are in their switched position, the fluid outlet 3 and a consumer connected thereto are subjected to a volume flow reduced in this manner, resulting in a slower pressure build-up at the fluid outlet 3, which ensures a "gentle" or slower start-up of a connected consumer.

Due to the dual channel design of the safety valve 1, redundant energy-free switching and switching of connected consumers or connected machine components is always ensured including in the event of a fault or failure of one of the two main stages 4 or 10. Both main stages 4 and 10 must always switch before the fluid outlet 3 is pressurized. If one of the two main stages 4 or 10 switches due to a fault when the system is relieved and in the intended rest state, the fluid outlet 3 remains relieved via the relief outlet of the main stage that has remained in its intended relieved rest position so that an unintended start-up is prevented. If only one of the two main stages 4 or 10 switches back to its relieved rest position when the system is pressurized and there is an intended change to the rest position—for example, in the event of a spring break in the other main stage—the fluid outlet 3 is already relieved solely via the one of the two main stages 4 or 10 which has switched back, so that redundant energy-free switching is ensured. Supplementary sensor-based state monitoring can be used to detect such individual failures and achieve higher categories and performance levels in terms of the standard, as described in the prior art.

Due to the two-part configuration of the tappets of the two main stages 4 and 10, the safety valve 1 also has an overlap-free valve function. A sudden temporary pressure increase at one of the relief outlets 5 or 11 when switching the main stages 4 and 10 from the relieved rest position to the pressurized switched position is reliably prevented by purely constructive means, as the first tappet parts 6 and 12 always initially close the flow paths to the relief outlets 5 and 11 before the pressurization passages are opened by the movement of the second tappet parts 8 and 13.

Figure 3:
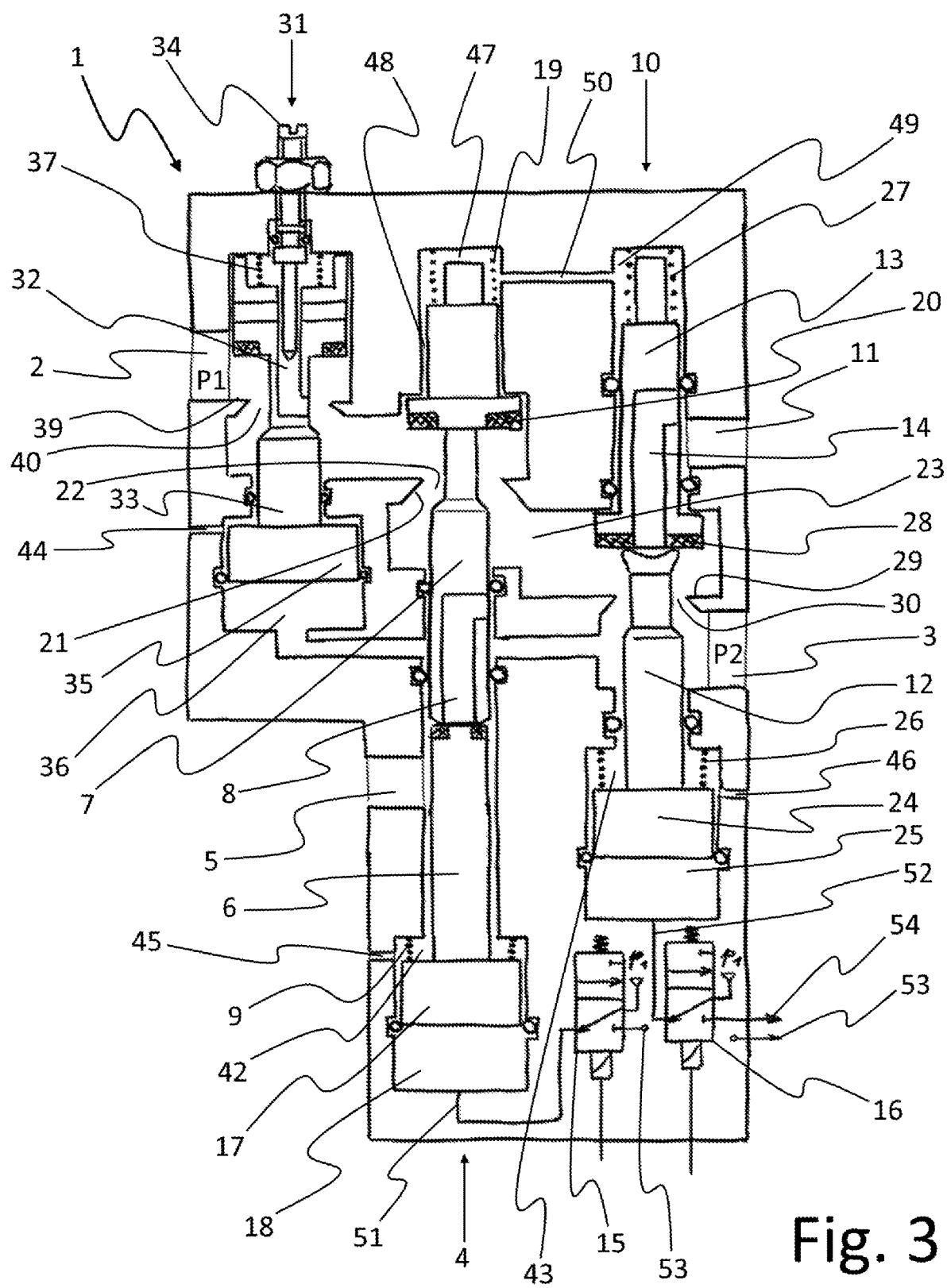
FIG. 3 a schematic cross-sectional view of the safety valve according to FIG. 1 in a fully connected operating position.

FIG. 3 shows the safety valve in its completely switched operating position, in which the start-up valve 31 is also switched in addition to the two main stages 4 and 10 and causes the fluid outlet 3 to be pressurized with the full system performance at the maximum flow cross-section. If both main stages 4 and 10 are in their switched position, the fluid outlet 3 and a consumer connected thereto are initially subjected to a reduced volume flow, which ensures a "gentle" or slower start-up of a connected consumer. The valve outlet pressure P2 increases gradually in this case. The start-up valve 31 is configured such that it switches automatically from its closed rest position to its open position upon reaching the switching pressure at the fluid outlet 3. Here, the piston 35 is pressurized via the piston chamber 36 with the switching pressure present at the fluid outlet 3, whereby the one-piece tappet 33 is moved upwards counter to the force of the spring 37, wherein the sealing body 38 formed in the upper portion of the tappet 33 lifts off the valve seat 39 and opens the pressurization passage 40 between the fluid inlet 2 and the first main stage 4. The pressurization passage 40 has a larger flow cross-section than the flow cross-section of the throttle channel 32. In this open switched position of the start-up valve 31, the working fluid flows from valve inlet 2 via the larger flow cross-section of the pressurization passage 40 into the safety valve 1, thereby increasing the valve output pressure P2 to the operating pressure and allowing the full fluidic performance to be drawn.

Figure 4:
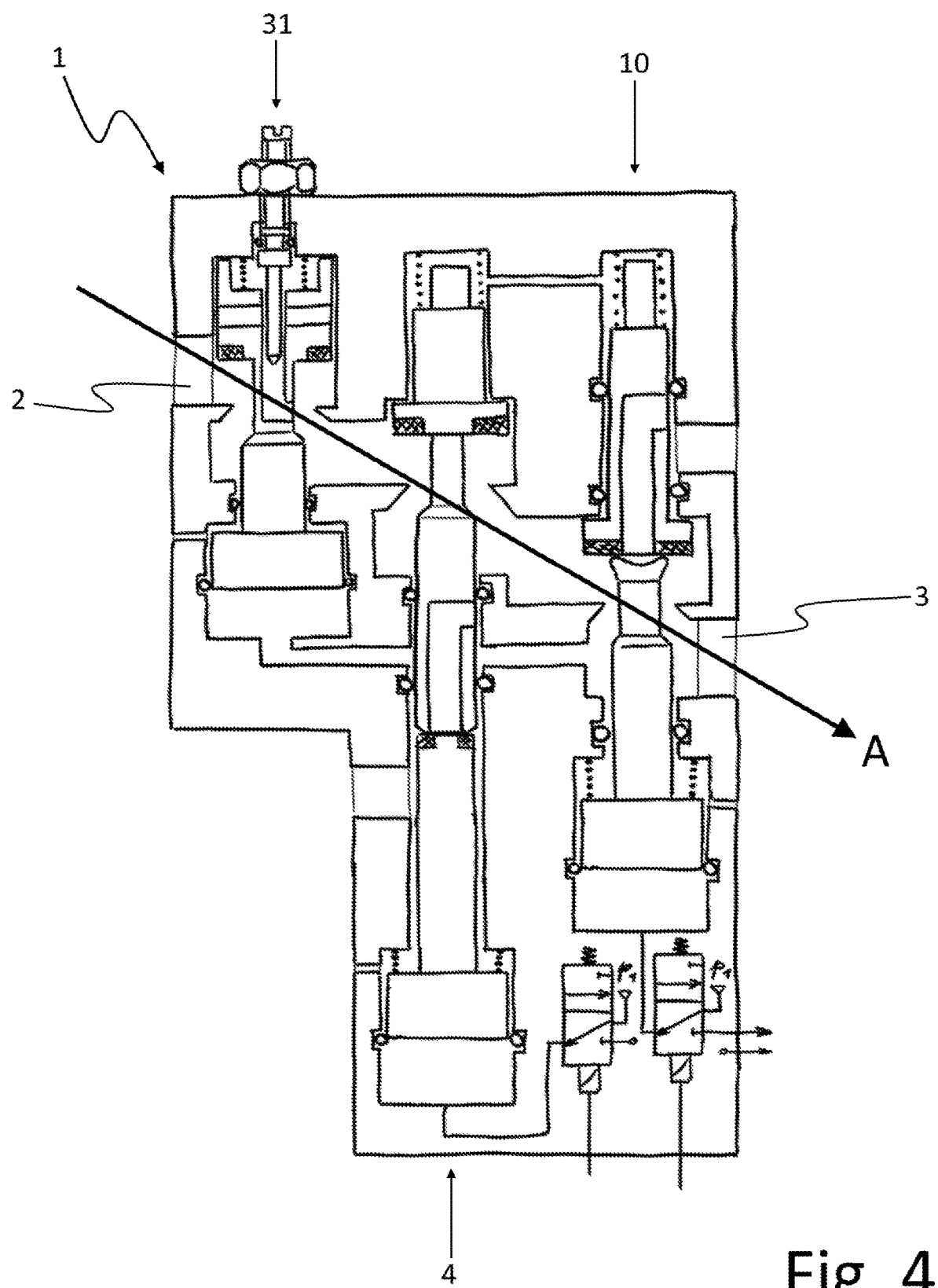

FIG. 4 shows the schematic cross-sectional view according to FIG. 3 with the flow path A marked. Most of the reference numerals were omitted in FIG. 4 for better recognizability of the flow path A through the switched and fully open safety valve 1 for representation reasons. The safety valve 1 is designed to be deflection-free in that all the pressurization passages 40, 22 and together with the fluid inlet 2 and fluid outlet 3 are arranged offset from one another, such that they form a linear flow path A in the switched position of the start-up valve 31 and the two main stages 4 and 10, as shown in FIG. 4.

The safety valve 1 also simultaneously forms a highly compact and integrated unit, which is in particular achieved by the fact that the second tappet parts 7 and 13 and the one-piece tappet 33 are each partially designed as hollow tappets with the internal fluid channels 8 and 14 and the throttle channel 32, and all components are integrated as a structural unit into a common housing.

Chambers 41, 42 and 43 are connected to the atmosphere to ensure pressure balance using breathing bores 44, 45 and 46. These breathing bores may alternatively be designed as internal channels in the housing that are vented to the atmosphere individually or collectively. Furthermore, the pressure equalization of chamber 42 can also be carried out via an annular gap between the tappet 6 and the housing inner wall to the first relief outlet 5 instead of via breathing holes or fluid channels, i.e., into the next chamber at the same pressure level, as is the case with the design of chamber 47. Pressure equalization is also established via the annular gap 48 between the upper portion of the second tappet part 7 and the housing portion surrounding it, albeit at the high-pressure level P1 instead of the atmospheric level. The same applies to the chamber 49, which is connected to the chamber 47 or another chamber for this purpose via the breathing channel 50, where the pressure level P1 is also present. The piston chambers 18 and 25 can be pressurized and relieved via the connection channels 51, 52 to the pilot valves 15 and 16, wherein the pressure is relieved in each case via the pilot valve outlets 53, 54, for example via individual or combined channels through the housing into the atmosphere.

LIST OF REFERENCE SIGNS

1 Safety valve
2 Fluid inlet
3 Fluid outlet
4 First main stage
5 First relief outlet
6, 12 First tappet part
7, 13 Second tappet part
8, 14 Fluid channel
9, 19, 26, 27, 37 Spring
10 Second main stage
11 Second relief outlet
15, 16 Pilot valve
17, 24, 35 Piston
18, 25, 36 Piston chamber
20, 28, 38 Sealing body
21, 29, 39 Valve seat
22, 30, 40 Pressurization passage
23 Fluid connection passage
31 Start-up valve
32 Throttle channel
33 One-piece tappet
34 Throttle screw
41, 42, 43, 47, 49 Chamber
44, 45, 46 Breathing bore
48 Annular gap
50 Breathing channel
51, 52 Connection channel
53, 54 Pilot valve outlet

The invention claimed is:

1. A safety valve for connecting high pressures and flows, comprising:
a fluid inlet;
a fluid outlet;
a first main stage; and
a second main stage,
wherein the first main stage, in a rest position, is configured to connect the fluid outlet to a first relief outlet and, in a switched position, the first main stage is configured to connect the fluid inlet to a fluid connection for the second main stage,
wherein the second main stage, in a rest position, is configured to connect the fluid outlet to a second relief outlet and, in a switched position, the second main stage is configured to connect the fluid connection to the fluid outlet;
wherein the first main stage and the second main stage are each configured as a seat valve having a corresponding multipart linear movable tappet,
wherein the linear moveable tappet of the first main stage includes a first tappet part and a second tappet part,
wherein when the first main stage transitions from the rest position to the switched position, the first tappet part of the first main stage is actuated counter to a spring load, and, in a first movement portion of the first main stage, the first tappet part of the first main stage initially sealingly abuts the second tappet part of the first main stage, such that a relief passage to the first relief outlet is closed, and in response to movement of the second tappet part of the first main stage in a second movement portion of the first main stage or a further tappet part of the first main stage in a further movement portion, a pressurization passage between the fluid inlet and the fluid connection for the second main stage is opened counter to a spring load, and
wherein the linear movable tappet of the second main stage includes a first tappet part and a second tappet part,
wherein and when the second main stage transitions from the rest position to the switched position, the first tappet part of the second main stage that is actuated counter to a spring load, in a first movement portion of the second main stage, the first tappet part of the second main stage initially sealingly abuts the second tappet part of the second main stage, such that a relief passage to the second relief outlet is closed, and in response to movement of the second tappet part of the second main stage in a second movement portion of the second main stage or a further tappet part in a further movement portion, a pressurization passage between the fluid connection and the fluid outlet is opened counter to a spring load.

2. The safety valve according to claim 1, wherein:
at least one of the second tappet part of the first main stage and the second tappet part of the second main stage includes an internal fluid channel that opens into a first opening facing the corresponding first tappet part, and
the first opening is closed by an end of the corresponding first tappet part that faces the first opening when the corresponding first tappet part sealingly abuts the corresponding second tappet part.

3. The safety valve according to claim 2, wherein:
the internal fluid channel opens at an end opposite the first opening into a second opening,
the second opening is arranged in a side face of the second tappet part, and
the first and second openings each open into regions of the safety valve that are separated from one another fluidically by closing the internal fluid channel.

4. The safety valve according to claim 2, wherein:
the internal fluid channel, at an end opposite the first opening, is crossed by at least one transverse bore,
each transverse bore forms two bore openings in the side face of the second tappet part, and
the first opening and the bore openings open into regions of the safety valve that are separated from one another fluidically by closing the internal fluid channel.

5. The safety valve according to claim 1, further comprising:
a start-up valve arranged in a flow path between the fluid inlet and the first main stage,
wherein the flow path is switched by pressure applied to the fluid outlet, and
wherein the start-up valve is configured to switch from a smaller flow cross-section to a larger flow cross-section upon reaching a definable pressure level at the fluid outlet.

6. The safety valve according to claim 5, wherein the smaller flow cross-section is formed by another fluid channel penetrating a shut-off body of the start-up valve.

7. The safety valve according to claim 6, wherein the start-up valve is configured with an adjustable throttle for adjusting the smaller flow path.

8. The safety valve according to claim 5, wherein:
pressurization passages of (i) the first main stage and the second main stage, or the first main stage, the second main stage, and the larger flow cross-section of the start-up valve are arranged relative to each other, such that a linear flow path is formed in the switched positions of the valves between the pressurization passages or the pressurization passages and the larger flow cross-section.

9. The safety valve according to claim 8, wherein a linear flow path is formed between the fluid inlet and the fluid outlet together with the pressurization passages or the pressurization passages and the larger flow cross-section.

10. The safety valve according to claim 1, wherein:
the first main stage and the second main stage are fluidically actuated, such that the first tappet part of each of the first main stage and the second main stage is formed with a piston at a corresponding end facing away from the corresponding second tappet part, and
the piston is pressurized on a side facing away from the corresponding first tappet part with a fluid pressure.

11. The safety valve according to claim 10, further comprising:
a switchable pilot valve configured to control pressurization of the pistons,
wherein the pistons are pressurized in each case by an internal control fluid supply with pressure present at the fluid inlet.

12. The safety valve according to claim 1, wherein all components of the safety valve are configured as a structural unit in a common housing.

* * * * *